C. H. LAND, Jr.
TRAILER.
APPLICATION FILED JUNE 14, 1920.

1,400,752.

Patented Dec. 20, 1921.
3 SHEETS—SHEET 1.

Inventor
Charles H. Land Jr.
By S. E. Thomas
Attorney

C. H. LAND, Jr.
TRAILER.
APPLICATION FILED JUNE 14, 1920.
1,400,752.
Patented Dec. 20, 1921.
3 SHEETS—SHEET 2.
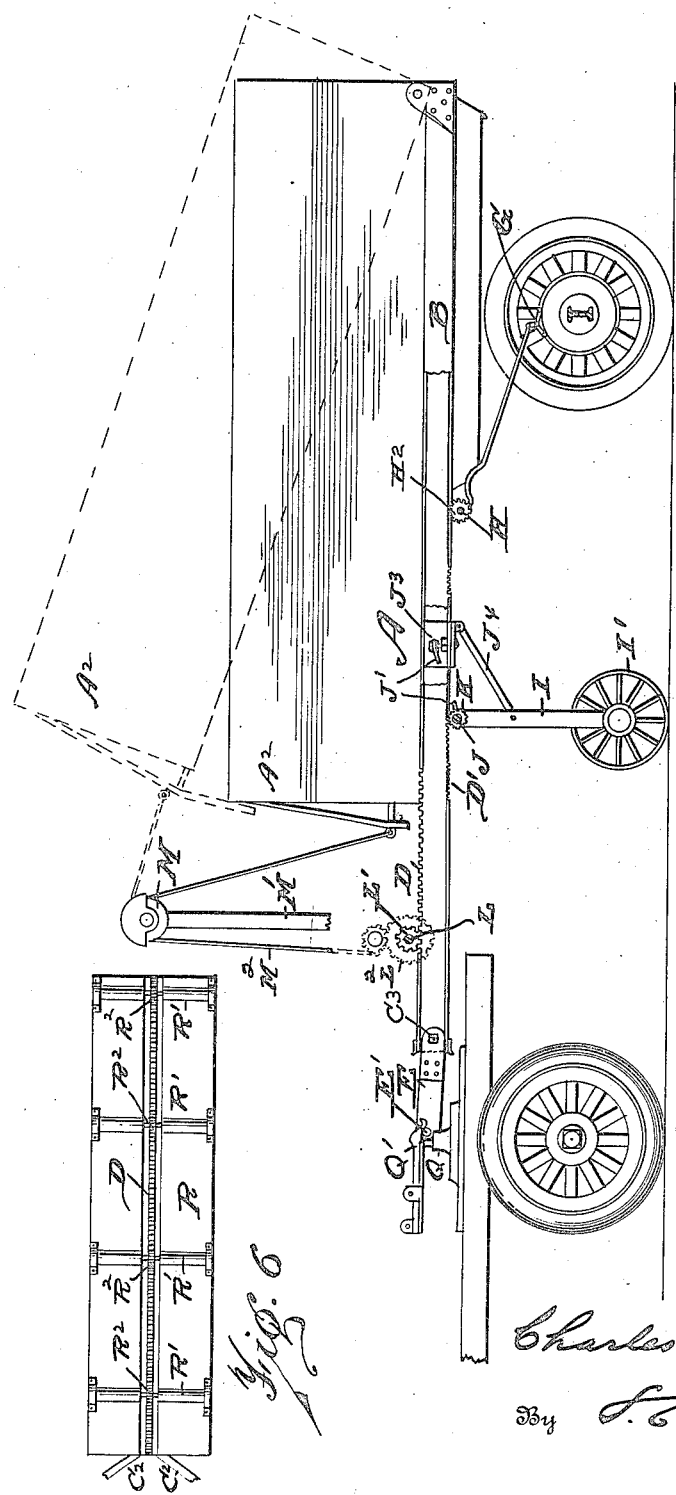
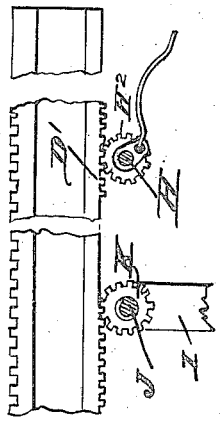
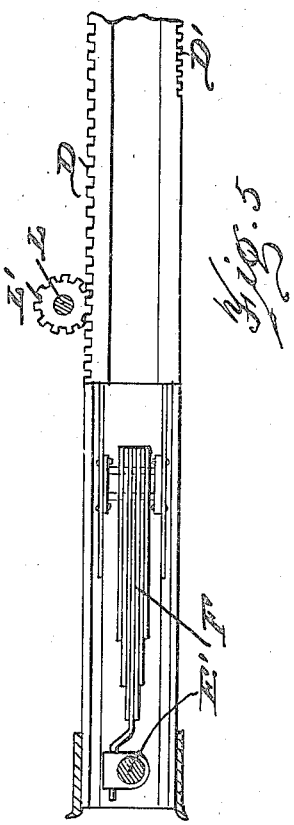

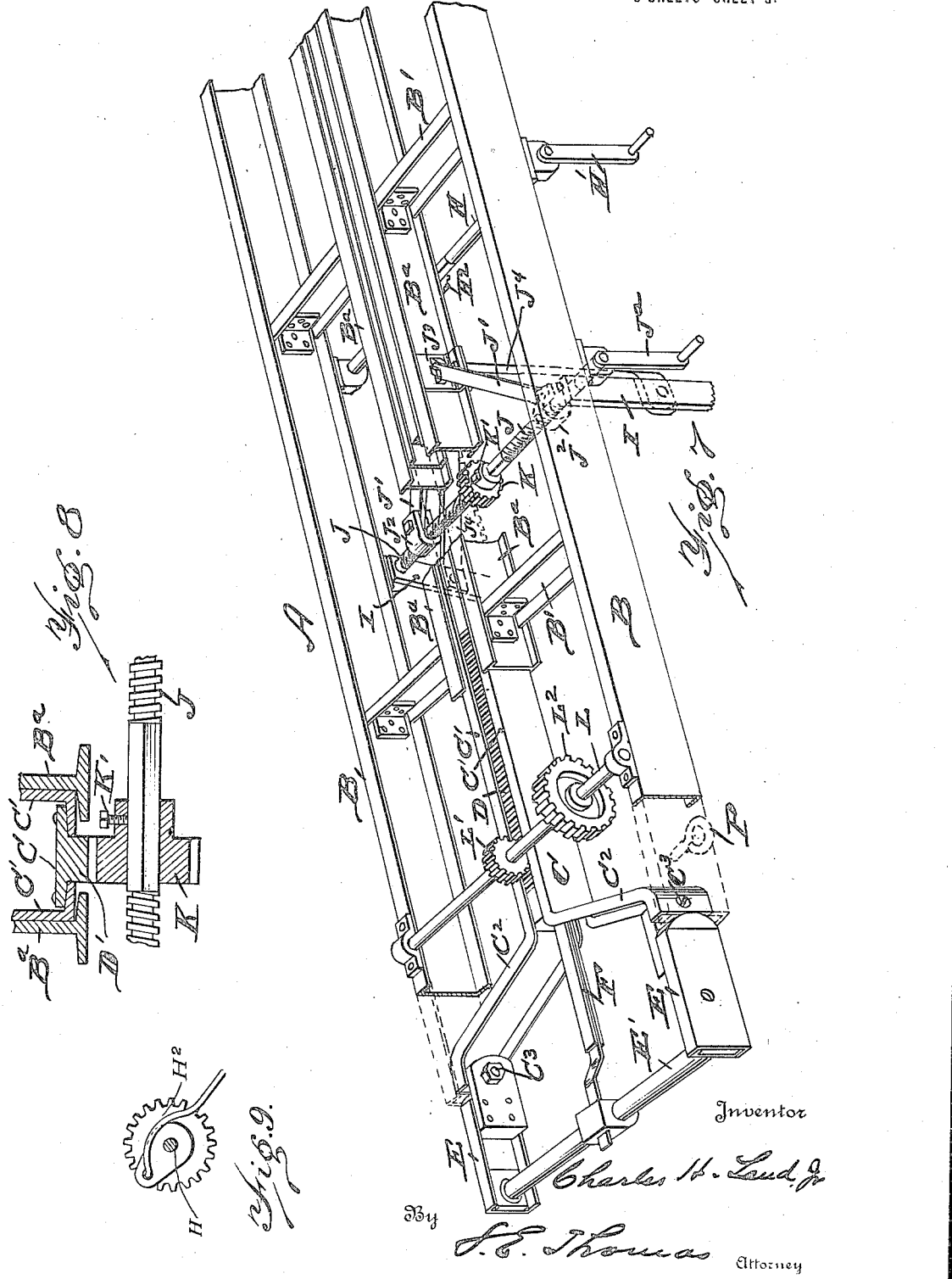

UNITED STATES PATENT OFFICE.

CHARLES H. LAND, JR., OF DETROIT, MICHIGAN, ASSIGNOR OF ONE-HALF TO WILLIAM H. WILSON, OF DETROIT, MICHIGAN.

TRAILER.

1,400,752.   Specification of Letters Patent.   Patented Dec. 20, 1921.

Application filed June 14, 1920. Serial No. 388,813.

*To all whom it may concern:*

Be it known that I, CHARLES H. LAND, Jr., a citizen of the United States, residing at Detroit, county of Wayne, State of Michigan, have invented a certain new and useful Improvement in Trailers; and declare the following to be a full, clear, and exact description of the same, such as will enable others skilled in the art to which it pertains to make and use the same, reference being had to the accompanying drawings, which form a part of this specification.

This invention relates to a trailer shown in the accompanying drawings and more particularly described in the following specification and claims.

Among other objects of the present invention, is the construction of a trailer with a longitudinally movable member or reach adapted to be detachably connected with a tractor, that it may transmit the power of the latter to operate a plurality of mechanisms carried by the trailer, as for example; —a swinging supporting leg for the trailer, —which may be either automatically, or manually raised and lowered;—a power shaft mechanism for unloading the trailer; and a brake mechanism for the wheels of the latter, whereby sufficient resistance to a forward and backward movement of the trailer may be afforded so that the reach may be operated to lower or raise the supporting leg;—to rotate the power shaft for discharging the contents of the trailer;—or for other requirements.

A further object is to provide a spring supported pivoted draw-bar member for facility in coupling the trailer to a truck or tractor and also to admit of the proper action of the longitudinally movable member.

A further object is to provide for either the automatic or manual raising and lowering of the swinging supporting leg.

A still further object is to provide for either the automatic or manual application of the brake mechanism to the wheels of the trailer.

With the foregoing and other objects in view which will appear as the description proceeds, the invention further resides in the combination and arrangement of parts and in the details of construction hereinafter described and claimed, it being understood that changes may be made in the precise embodiment of the invention herein disclosed without departing from the spirit of the same.

In the drawings accompanying this specification and forming part thereof:—

Fig. 4 is a side elevation of the trailer connected with a tractor with the brake set and the leg lowered to support the trailer,— as when operated by the slidable reach shifted through the action of the tractor;— also indicating in dotted lines the body of the trailer tilted as when discharging its load through the operation of the unloading mechanism,—also actuated by the movement of the reach.

Fig. 5 is a longitudinal section with parts broken away, and in elevation, taken on or about line 5—5 of Fig. 3.

Fig. 6 is a plan view of a trailer fitted with rolls actuated by the slidable reach, adapted particularly for discharging lumber or the like.

Fig. 7 is a perspective view of a fragmentary portion of the frame of the trailer, with parts broken away and in section, showing the slidable reach, the flexible draw-bar pivoted thereto and the rack bars carried by the reach for operating the unloading mechanisms, swinging supporting leg and brake mechanism of the trailer.

Fig. 8 is a fragmentary cross-sectional view through the slidable reach, rack bar and pinion operated thereby,—showing the manner of disconnecting the pinion from the rack bar to permit the manual operation of the right and left screw shaft on which the pinion is mounted.

Fig. 9 is a detail view illustrating the arrangement of the brake operating mechanism when the same is in its locked position.

Figure 1:
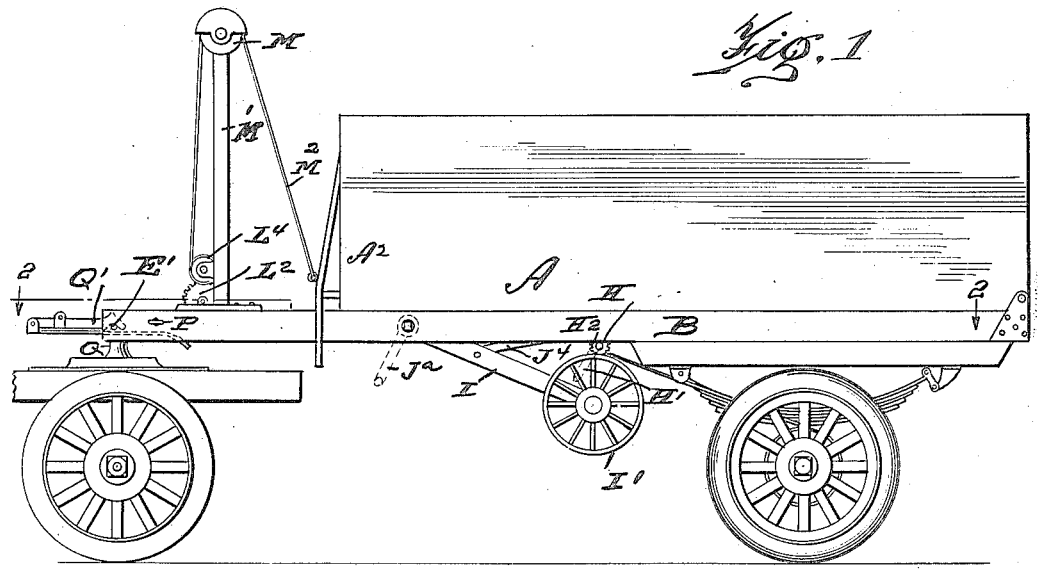
Figure 1 is a side elevation of a trailer embodying my invention, attached to the rear end of a tractor or truck, with the supporting leg raised, as when hauling.
Figure 2:
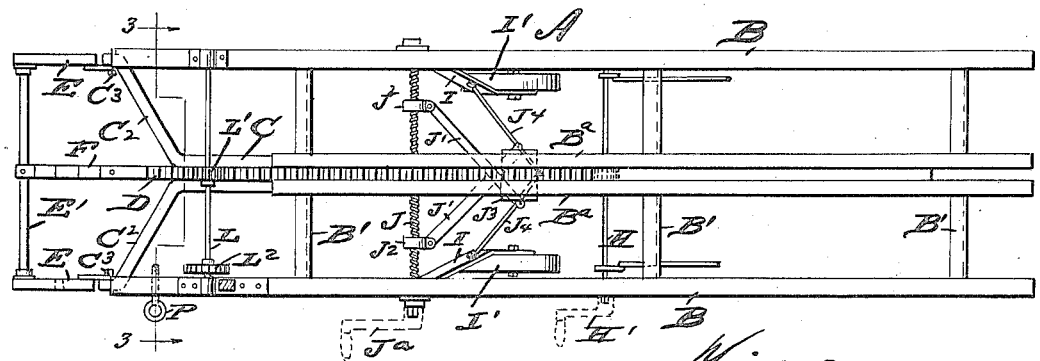
Fig. 2 is a plan view of the trailer.
Figure 3:
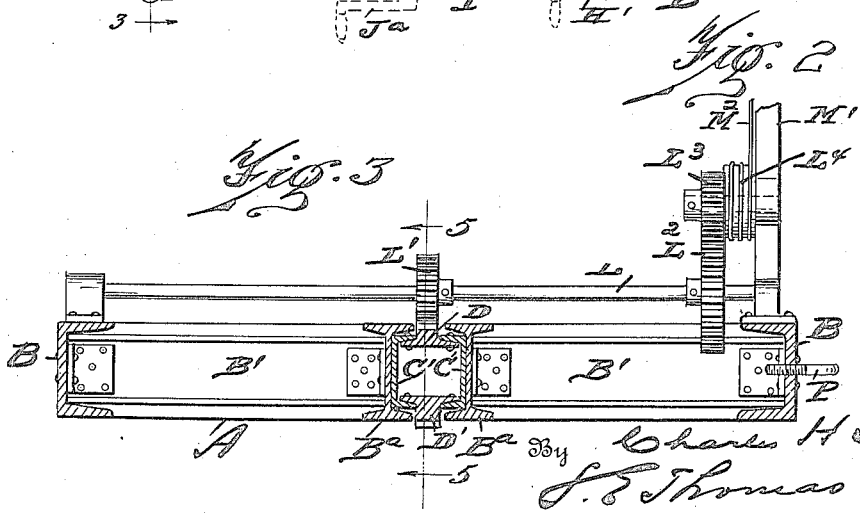
Fig. 3 is a cross-sectional view taken on or about line 3—3 of Fig. 2.

Referring now to the letters of reference placed upon the drawings:—

A, denotes a trailer, embodying a suitable channel frame B B, forming the side sills of the vehicle, B^a, B^a, denotes a pair of I-beams spaced apart and supported between the side sills by a plurality of transverse members B' bolted to the sills and the I-beams.

C, denotes a slidable reach located between the I-beams, consisting of a pair of channel irons C', C', spaced apart and bolted to an upper and lower rack-bar D and D' and thereby forming a single longitudinally slidable unit. The channel irons C' C', at the forward end of the reach extend laterally as indicated at C^2, C^2, into the channel irons B, B, or side sills of the trailer. Pivoted to the ends of the channel irons C' C', by bolts C^3 is a draw bar frame E, carrying the draw bar E',—the latter being yieldingly supported on a plane with the side sills by a spring r bolted to the end of the reach.

G, denotes a suitable brake mechanism for the wheels of the trailer which may either set manually through the rotation of the shaft H by the crank H', or automatically, by the forward movement of the reach and its mutilated rack-bar D' engaging the pinion H^2:—slidable laterally on the shaft H, that the pinion may be disconnected from the teeth of the rack bar when the shaft is manually operated. The pinion H^2 is secured to the shaft H, in either its meshed or demeshed relation to the rack-bar, by a suitable set-screw. The front sectional portion of the mutilated rack bar D' operates the pinion H^2 and the said meshing section or portion of the mutilated rack bar D' is of sufficient number of teeth to set the brake and carry the crank shaft H to a locking position, after which the said front section or portion disengages the pinion H^2 and leaves the crank shaft in such set and locked position during the continued forward movement of the reach.

I indicates a swinging leg pivoted to a transverse right and left screw-threaded shaft J journaled in the side sills of the frame of the trailer. K is a pinion slidable on a central squared portion of the shaft,—and secured thereto by a set screw K' that the shaft may be rotated by the pinion through the movement of the rack-bar or manually by the crank arm J^a. J' indicates toggle arms pivoted to the two screw sleeves J^2 mounted respectively on the right and left screw-threaded portions of the shaft. The opposite end of the toggle arms are pivoted to the sliding member J^3 supported by the I-beams B^a, B^a, J^4 are links connected with the member J^3 and with the swinging leg I,—the lower end of which is fitted with wheels I'. L, denotes a transverse shaft fitted with a pinion L' adapted to mesh with the upper rack bar D, and with a gear L^2 in mesh with a pinion L^3 on the shaft of the winding drum L^4. M. is a pulley mounted upon a standard M' secured to the trailer frame, and M^2 is a hoisting cable connected with the dump body A', and to the winding drum L^4. It will thus be clear that the reach with its lower mutilated rack bar and upper rack bar is adapted to apply and lock the brake in a set position and swing the pivoted supporting leg I into operative position and finally elevate the body to a dumping position.

P is a lock pin extending through the side sills of the trailer frame and into the slidable reach to secure the latter in fixed relation to the trailer frame when desired.

Q is a fifth wheel member carried by the tractor having a latch Q' adapted to engage the draw-bar E'.

R indicates the bed frame of a lumber trailer fitted with rollers R', suitably journaled and provided with pinions R^2 adapted to mesh with the rack bar D, whereby the several rolls may be operated to assist in discharging the lumber piled thereon.

Having now indicated the several parts by reference letters the construction and operation of the device will be readily understood:—

The trailer having been coupled with the tractor, the locking pin P is removed that the reach may be adapted to slide between the I-beams of the trailer. The tractor or truck is then driven ahead slowly drawing the reach C, out from between the I-beams causing the mutilated rack bar D' to engage the pinion H^2 rotating the shaft H, and thereby setting the brake mechanism G. The trailer now offers a high resistance to any attempt to shift its position, and the reach may be readily drawn out by the tractor to the position shown in Fig. 4 which action causes the rack bar D' to rotate the pinion K,—slidable laterally on the shaft J, that it may be thrown out of gear with the rack bar when desired—the toggle mechansim J' is thus operated by the screw sleeves on the right and left screw shafts with which it is connected thereby causing the swinging leg I to move downwardly into a vertical position as shown in Fig. 4 to support the forward end of the trailer. By releasing the set screw K' and pushing the gear K out of mesh with the rack bar D' the supporting leg I may be manually raised and lowered through the operation of the crank arm J^a. In the forward position of the reach C, the draw-bar frame E, pivoted thereto is freed from the channel members B, B,—or side sills of the trailer:—this allows the trailer to drop upon its supporting leg, as shown in Fig. 4, thereby taking the strain off the slidable reach.

A further forward movement of the tractor or truck will cause the rack bar D to actuate the gear L', the shaft L, gears L^2 and L^3 and winding drum L^4. The hoisting cable is thus wound up causing the dump-body of the trailer to discharge its load. If desired other mechanisms may be operated in a similar manner.

As shown in Fig. 6, a removable frame may be placed in the bottom of the trailer fitted with a plurality of rollers actuated by pinions in mesh with the rack bar, to facilitate the discharge of its load. It will be understood that the application of the brake is not essential to the action of coupling or uncoupling the trailer and tractor— the flexible draw-bar member requiring only the inertia of the trailer to cause the coupling bar to slide up the inclined way of the fifth wheel into a locking position. It will also be understood that the action of the swinging leg is not coincident with the setting of the brake but is entirely independent thereof. The gear for operating the swinging leg may be thrown out of meshed relation with the rack bar allowing the swinging leg to remain in a vertical position, the slidable reach will then set the brake automatically without acting upon the supporting leg.

Having thus described my invention, what I claim is:

1. In a traction machine, a tractor, a trailer, a folding supporting leg for the trailer, a slidable member detachably connected with the tractor adapted to throw said supporting leg into or out of action.

2. In a traction machine, a tractor, a trailer, means for braking the wheels of the trailer movable to and from a locked position, and a slidable member detachably connected with the tractor adapted to operate braking means through the movement of the tractor and leave the brake mechanism in a locked position.

3. In a traction machine, a tractor, a trailer detachably connected thereto, a plurality of operative mechanisms carried by the trailer and including a brake movable to and from a locked position, means carried by the trailer detachably connected with the tractor adapted to admit of a limited independent movement of the tractor with regard to the trailer and to transmit the motive power of the tractor to the several operative mechanisms of the trailer including means for leaving the brake in a locked position.

4. In a traction machine, a tractor, a trailer detachably connected thereto, a plurality of operative mechanisms carried by the trailer, a movable reach carried by the trailer detachably connected with the tractor and at a plurality of points with the said mechanisms and adapted to operate one or more of the several operative mechanisms of the trailer in successive order.

5. In a traction machine, a tractor, a trailer detachably connected thereto by a slidable member having rack-gear teeth, a brake mechanism for the wheels of the trailer including a pinion adapted to be actuated by the rack-gear teeth of said slidable member, a folding supporting leg for the trailer, means for raising and lowering said leg including a gear also adapted to be actuated by the rack-teeth of the slidable member.

6. In a traction machine, a tractor, a trailer, a slidable member supported in the frame of the trailer, a draw-bar pivoted to the slidable member adapted for detachable connection with the tractor, said draw-bar and slidable member having a limited movement independent of the trailer through the operation of the tractor, and a plurality of operative mechanisms carried by the trailer adapted to be successively actuated through the movement of said slidable member and movable to a set position.

7. In a traction machine, a tractor, a trailer, a slidable reach fitted with rack gear teeth, a spring supported draw-bar pivoted to the slidable reach, means for detachably connecting said draw-bar with the tractor, a brake mechanism for the tractor wheels, means for actuating said brake mechanism including a gear adapted to be actuated by the rack gear teeth of the slidable reach, a folding supporting leg for the trailer, and means for actuating said leg including a gear also actuated by the rack-gear teeth of the slidable reach through the movement of the tractor.

8. In a traction machine, a tractor, a trailer, a slidable reach carrying rack-gear teeth, a draw-bar supported in a Y-shaped frame guided by the side sills of the trailer and pivoted to the slidable reach, a spring for supporting the draw-bar, a folding supporting leg for the trailer and means for operating said leg including a gear adapted to be actuated by the rack-gear teeth of the reach through the movement of the tractor.

9. In a traction machine, a tractor, a trailer, a dump-body hinged to the frame of the trailer, a slidable reach carrying rack-bar teeth detachably connected with the tractor, means for tilting said dump body carried by said trailer including a gear adapted to be actuated by the rack-bar teeth of the reach through the independent movement of the tractor.

10. In a trailer, a plurality of operable mechanisms including a brake movable to and from a locked position, a movable reach adapted for connection with a tractor, means actuated through said reach for operating said mechanisms and for leaving the brake in a locked position, and means for locking said reach against movement.

11. A traction trailer including a slidable reach, brake mechanism, a pivoted supporting leg, and means connected with the brake mechanism and with the pivoted leg and successively operated by the slidable reach for applying the brake and for carrying the leg to its supporting position.

12. A traction trailer including a slidable reach, brake mechanism, a pivoted supporting leg, and rack and pinion mechanism connected with the brake mechanism and with the said leg and arranged to successively apply the brake mechanism and carry the said leg to supporting position.

13. A traction trailer including a slidable reach, brake mechanism, a pivoted supporting leg, means connected with the brake mechanism and with the pivoted leg and successively operated by the slidable reach for applying the brake and for carrying the leg to its supporting position, a dumping body, and means also operated by the sliding reach for moving the body to dumping position.

In testimony whereof, I sign this specification in the presence of two witnesses.

CHARLES H. LAND, Jr.

Witnesses:
S. E. THOMAS,
JOHN CONSIDINE, Jr.